US007010218B2

(12) United States Patent
Nam

(10) Patent No.: US 7,010,218 B2
(45) Date of Patent: Mar. 7, 2006

(54) DIGITAL MAGNETIC RECORDING/REPRODUCING DEVICE FOR RECORDING/REPRODUCING PLURAL TYPES OF AUDIO DATA, AND RECORDING/REPRODUCING METHOD THEREFORE

(75) Inventor: Young-Min Nam, Suwon (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 829 days.

(21) Appl. No.: 09/977,290

(22) Filed: Oct. 16, 2001

(65) Prior Publication Data

US 2002/0094194 A1 Jul. 18, 2002

(30) Foreign Application Priority Data

Jan. 17, 2001 (KR) ................................ 2001-2530

(51) Int. Cl.
*H04N 5/91* (2006.01)

(52) U.S. Cl. .............................. 386/96; 386/54; 360/8

(58) Field of Classification Search .................. 386/96; 360/8, 22, 18, 61

See application file for complete search history.

(56) References Cited

U.S. PATENT DOCUMENTS 3,913,135 A * 10/1975 Damlamian .................. 360/18
4,772,959 A * 9/1988 Amano et al. .............. 386/104
5,414,523 A * 5/1995 Azuma et al. .............. 386/104
5,915,066 A * 6/1999 Katayama .................... 386/70
6,243,481 B1 * 6/2001 Tao ........................... 382/100
6,397,000 B1 * 5/2002 Hatanaka et al. ............. 386/98

* cited by examiner

*Primary Examiner*—James J. Groody
*Assistant Examiner*—James A. Fletcher
(74) *Attorney, Agent, or Firm*—Robert E. Bushnell, Esq.

(57) ABSTRACT

A digital magnetic recording/reproducing device for recording or reproducing plural sorts of audio data, and a recording/reproducing method therefor. The digital magnetic recording/reproducing device includes an analog-to-digital (A/D) and digital-to-analog (D/A) converter for converting an audio analog signal into digital data or vice versa, a formatter/deformatter for converting a format of the audio signal and the data grouped to be stored in the recording sectors of the magnetic tape, a recording selection unit for transmitting the input audio signal to the A/D converter or formatter according to the type of the audio signal, and a reproduction selection unit for transmitting the data reproduced from the magnetic tape to the D/A converter or deformatter. The output data from the A/D converter and the output data from the formatter are recorded on the different recording sectors of the magnetic tape. As a result, the audio data corresponding to the video image and a different type of audio data such as MP3 data, can be recorded and reproduced on the magnetic tape.

33 Claims, 4 Drawing Sheets

DIGITAL MAGNETIC RECORDING/REPRODUCING DEVICE FOR RECORDING/REPRODUCING PLURAL TYPES OF AUDIO DATA, AND RECORDING/REPRODUCING METHOD THEREFORE

CLAIM OF PRIORITY

This application makes reference to, incorporates the same herein, and claims all benefits accruing under 35 U.S.C. §119 from my application DIGITAL MAGNETIC RECORDER/PLAYER CAPABLE OF RECORDING/PLAYING A PLURALITY OF SORTS OF AUDIO DATA AND A RECORDING/PLAYING METHOD THEREOF filed with the Korean Industrial Property Office on 17 Jan. 2001 and there duly assigned Serial No. 2530/2001.

BACKGROUND OF THE INVENTION

1. Technical Field

The present invention relates to a digital magnetic recording/reproducing device, and in particular to a digital magnetic recording/reproducing device for recording or reproducing a number of different types of audio data, and a recording/reproducing method therefor.

2. Related Art

A digital magnetic recording/reproducing device such as a digital video camcorder records or reproduces image and sound as digital signals. As compared with an analog type, the digital magnetic recording/reproducing device has excellent screen and sound quality, and easily stores and edits the data. In general, the digital magnetic recording/reproducing device employs a 6 millimeter (mm) magnetic tape as a recording medium for storing digital data for image and sound.

I have found that magnetic tape is not being used as efficiently and advantageously as is possible. I believe that there is a need for an improved device and method for recording data onto magnetic tape and reproducing data from magnetic tape.

SUMMARY OF THE INVENTION

Accordingly, it is a primary object of the present invention to provide a digital magnetic recording/reproducing device which can variously utilize a magnetic tape by recording or reproducing plural types of audio data on the magnetic tape, and a recording/reproducing method therefor.

Another object of the present invention is to provide a digital magnetic recording/reproducing device which can variously utilize recording sectors and empty audio sectors, by recording or reproducing plural types of audio data on the redundant audio sectors or the recording sectors including audio sectors and video sectors, and a recording/reproducing method therefor.

In order to achieve the above-described objects of the present invention, there is provided a digital magnetic recording device including: an audio analog-to-digital (A/D) converter for converting an audio signal into a digital data; a formatter for formatting the audio signal in an appropriate size to be stored in the respective recording sectors of a magnetic tape; a recording selection unit for selectively transmitting the input audio signal to the audio A/D converter and the formatter according to a type of the audio signal; and a control unit for controlling a head so that output data from the audio A/D converter and output data from the formatter can be respectively recorded on the different recording sectors of the magnetic tape.

Preferably, the audio signal can be converted into predetermined digital data such as MP3 data by using an encoder, and provided to the formatter. In addition, the recording selection unit can be controlled according to the type of the audio signal discriminated in a discrimination unit. MP3 is a digital audio compression algorithm also known as "Moving Pictures Experts Group-1 audio layer 3" or "MPEG-1 audio layer 3".

The recording sectors where the output data from the formatter is recorded are the redundant audio sectors, exclusive of the audio sectors used correspondingly to the video sectors. Therefore, the redundant audio sectors can be variously utilized.

In another embodiment of the present invention, a digital magnetic reproducing device includes: an audio digital-to-analog (D/A) converter for converting audio data read from a magnetic tape into an analog audio signal; a deformatter for deformatting the audio data in an appropriate size to have a different type of data format from the audio signal; a reproduction selection unit for selectively transmitting the audio data to the audio D/A converter and the deformatter according to a type of the audio data; and a decoder for decoding the output data from the deformatter.

Preferably, the reproduction selection unit is controlled according to the type of the audio data discriminated in a discrimination unit. In addition, the output from the deformatter can be temporarily stored in a memory, and provided to the decoder.

According to the present invention, plural types of audio data can be recorded and reproduced on the magnetic tape for the digital magnetic recording/reproducing device. Especially, the redundant audio sectors which are not used to store general audio signals are used to record or reproduce different types of audio data. In addition to the dubbing operation using the redundant audio sectors, the audio signals can be recorded and reproduced on the redundant audio sectors, regardless of the video data. As a result, the magnetic tape can be variously utilized.

There is also provided a method for recording or reproducing plural types of audio data, which is performed by the digital magnetic recording/reproducing device.

To achieve these and other objects in accordance with the principles of the present invention, as embodied and broadly described, the present invention provides a digital magnetic recording apparatus, comprising: an analog-to-digital converter converting an input audio signal into digital data; a formatter formatting the audio signal in an appropriate size to be stored in respective recording sectors of a magnetic tape selected from among a first plurality of sectors of the magnetic tape; a recording selection unit selectively transmitting the input audio signal to one selected from among said formatter and said analog-to-digital converter, in dependence upon a type of the audio signal; and a control unit controlling a head to record output data from said analog-to-digital converter on a second plurality of sectors of the magnetic tape and to record output data from said formatter on the first plurality of sectors of the magnetic tape, said first and second pluralities of sectors being distinguishable.

To achieve these and other objects in accordance with the principles of the present invention, as embodied and broadly described, the present invention provides a digital magnetic reproducing apparatus, comprising: a digital-to-analog converter converting a first type of audio data read from a magnetic tape to an analog audio signal; a deformatter deformatting a second type of audio data read from the magnetic tape; a decoder decoding deformatted data output from said deformatter; and a reproduction selection unit selectively transmitting general audio data read from the magnetic tape to one selected from among said deformatter and said digital-to-analog converter, in dependence upon a type of the general audio data, said general audio data including said first and second types of audio data.

To achieve these and other objects in accordance with the principles of the present invention, as embodied and broadly described, the present invention provides a method recording different types of audio data on a magnetic tape for a digital magnetic recording/reproducing device, comprising: detecting a type of an input audio signal; when a format of the input audio signal does not correspond to a recording format of recording sectors of the magnetic tape, formatting the input audio signal in an appropriate size to be stored in the recording sectors of the magnetic tape; and recording a plurality of different types of audio signals in respective recording sectors of the magnetic tape.

To achieve these and other objects in accordance with the principles of the present invention, as embodied and broadly described, the present invention provides a method reproducing plural types of audio data stored on respective recording sectors of a magnetic tape for a digital magnetic recording/reproducing device, comprising: detecting at least one type of audio data read from said respective recording sectors of the tape, said at least one type including at least a first type and a second type; performing one selected from among digital-to-analog conversion and deformatting, said digital-to-analog conversion being selected and converting digital audio data read from the tape to analog audio data when said detecting detects a first type of audio data, said deformatting being selected and deformatting the audio data read from the tape when said detecting detects a second type of audio data, said first and second types being distinguishable; decoding said deformatted audio data; and reproducing one selected from among the digital-to-analog converted audio data and the decoded audio data.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
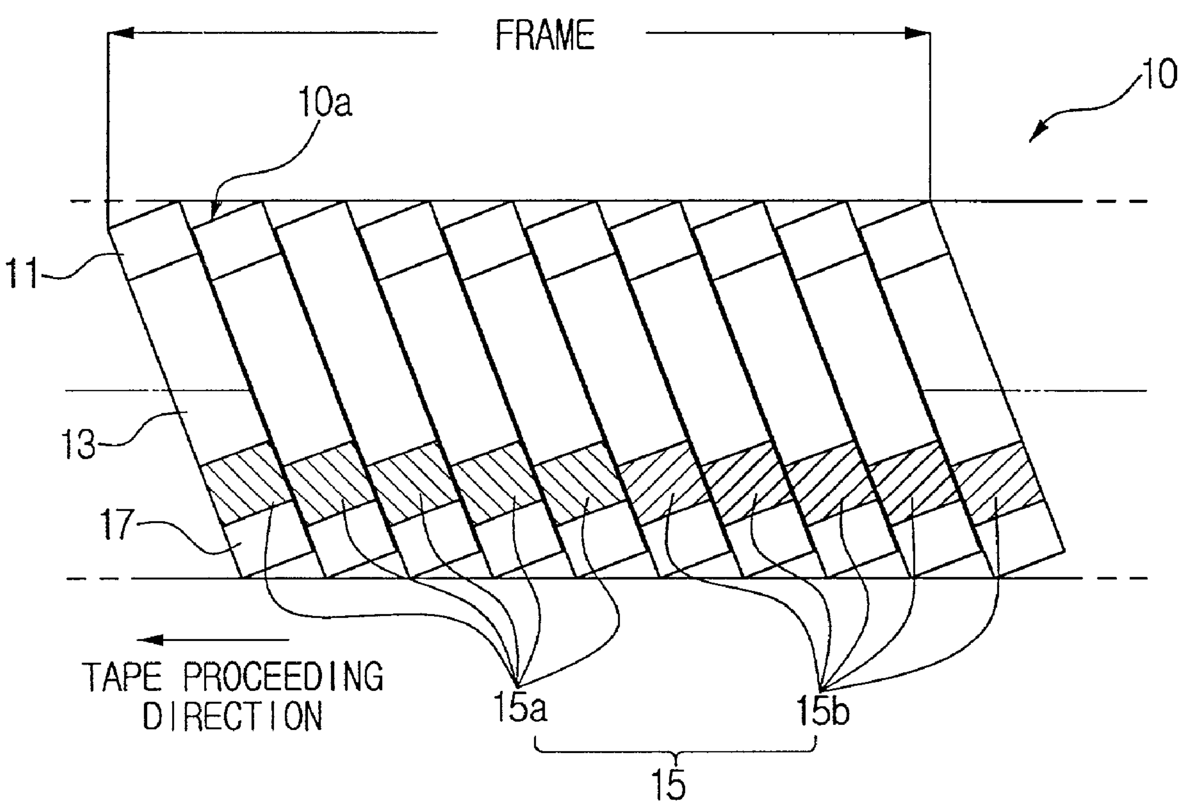
FIG. 1 illustrates a track structure of a tape for a digital magnetic recording/reproducing device.

FIG. 1 illustrates a part of a 6 millimeter (mm) magnetic tape for the digital magnetic recording/reproducing device. The tape 10 is divided into a plurality of tracks 10*a* slanted at a predetermined angle in a proceeding direction. In the NTSC method shown in FIG. 1, ten tracks 10*a* compose one frame. In the PAL method, twelve tracks 10*a* compose one frame. Each track 10*a* includes four sectors, namely a sub code sector 11, a video sector 13, an audio sector 15 and an insert and track information (ITI) sector 17. The four sectors 11, 13, 15, 17 of the respective tracks 10*a* are consecutively aligned in a longitudinal direction of the tape 10, thereby composing four channels, namely a sub code channel, a video channel, an audio channel and an ITI channel.

Here, date/time information and index information are recorded on the sub code sector 11, track information is recorded on the ITI sector 17, image signals and auxiliary information signals thereof are recorded on the video sector 13, and sound signals and auxiliary information signals thereof are recorded on the audio sector 15. Actually, the video sector 13 and the audio sector 15 store the image/sound signals, which are called a recording sector.

When the digital magnetic recording/reproducing device records information on the tape 10, the video sectors 13 of all the tracks 10*a* are used to record the image signals. However, the audio sectors 15 of all the tracks 10*a* or some tracks 10*a* are used to record the audio signals according to a recording method thereof. That is, in order to store 16 bit audio data, the audio sectors 15*a*, 15*b* of all the tracks 10*a* are employed. However, in general, 12 bit audio data is stored in the audio sectors 15*a* of the first five tracks in one frame. Accordingly, the audio sectors 15*b* of the last five tracks are empty. When sound signals are additionally recorded, the audio sectors 15*b* are used for dubbing. In the reproduction of the digital magnetic recording/reproducing device, the sound signals dubbed on the audio sectors 15*b* are reproduced with the sound data stored in the audio sectors 15*a*.

According to a data recording method, the audio sectors 15 and the video sectors 13 of the tape 10 are used merely to store sound and image data. Especially, the redundant audio sectors 15*b* are used merely for dubbing. When the dubbing operation is not performed, the audio sectors 15*b* are useless. That is, when the user does not perform the dubbing operation by using the digital magnetic recording/reproducing device, the redundant audio sectors 15*b* remain empty.

In addition, even when the audio sectors 15*b* are used for dubbing, the sound signals dubbed on the audio sectors 15*b* are reproduced with the sound signals stored in the audio sectors 15*a* in the reproduction of the digital magnetic recording/reproducing device. Accordingly, the auxiliary audio signals for image and sound can be additionally stored in the audio sectors 15*b*. As a result, it is difficult to variously utilize the empty audio sectors 15*b*.

A digital magnetic recording/reproducing device for recording or reproducing plural sorts of audio data, and a recording/reproducing method therefor in accordance with the present invention will now be described in detail with reference to the accompanying drawings. A magnetic tape 10 for the digital magnetic recording/reproducing device in FIG. 1 is also referred. The identical units to FIG. 1 are provided with the same reference numerals.

Figure 2:
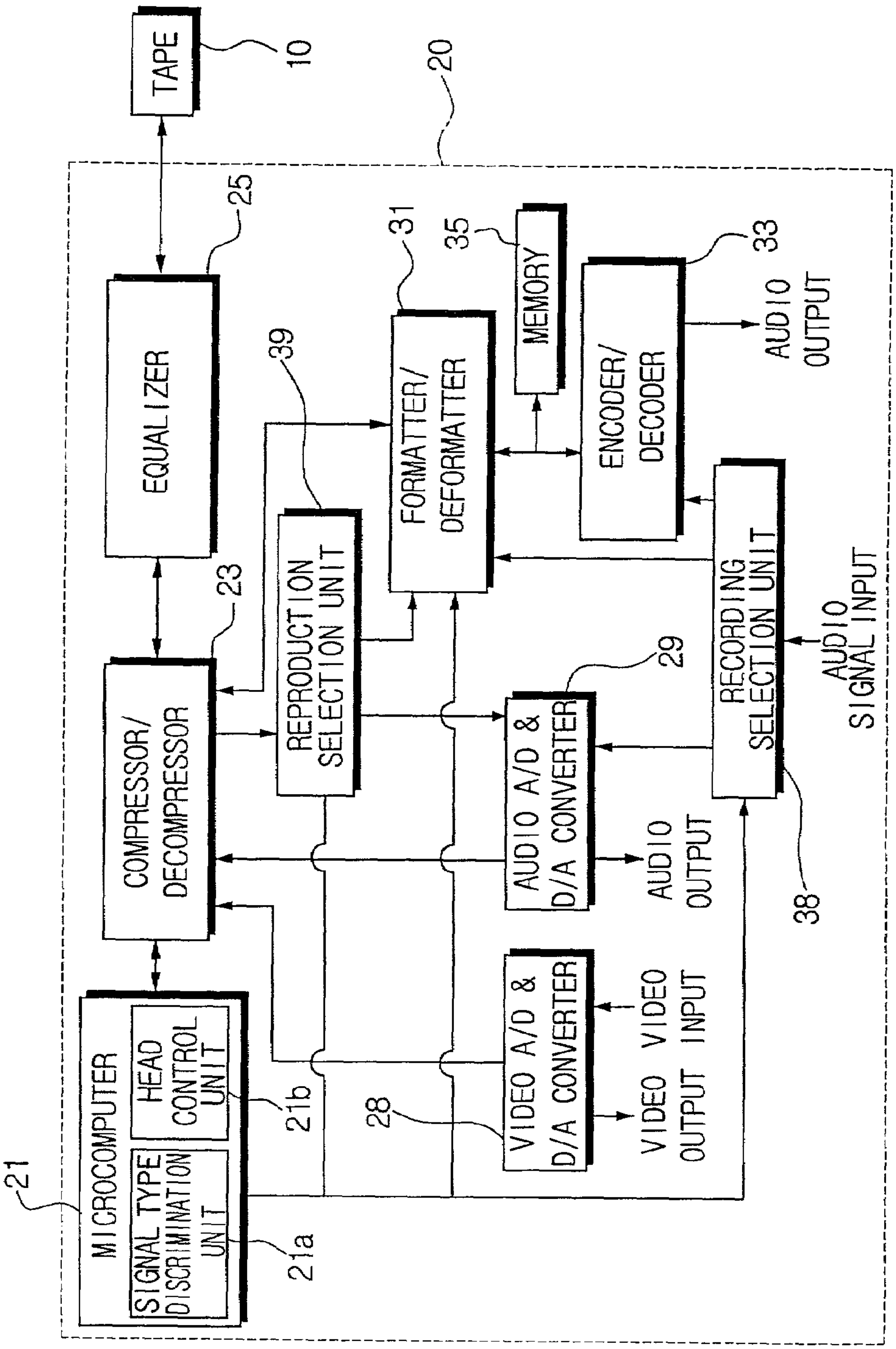
FIG. 2 is a block diagram illustrating a digital magnetic recording/reproducing device for recording or reproducing plural types of audio data, in accordance with the principles of the present invention.

FIG. 2 is a block diagram illustrating the digital magnetic recording/reproducing device in accordance with a preferred embodiment of the present invention. In this embodiment is exemplified a digital magnetic recording/reproducing device which can record and reproduce audio signals and a different type of MP3 data on the redundant audio sectors 15*b*.

The digital magnetic recording/reproducing device includes a microcomputer 21 for controlling the whole operation, a general equalizer 25, a compressor/decompressor 23, a video analog-to-digital (A/D) and digital-to-analog (D/A) converter 28, and an audio A/D and D/A converter 29. In addition, in order to record or reproduce a different type of MP3 data, the digital magnetic recording/reproducing device further includes a formatter/deformatter 31, an encoder/decoder 33 and a memory 35.

The equalizer 25 equalizes the data read from the magnetic tape 10 to a data for signal processing, by using a head (not shown). The audio A/D and D/A converter 29 converts an is audio signal from a microphone (not shown) into digital data, converts audio data from the audio sectors 15 of the magnetic tape 10 into an analog audio signal, and provides the resultant analog signal to a speaker (not shown). The video A/D and D/A converter 28 performs an operation similar to the audio A/D and D/A converter 29 on the video signal inputted to the magnetic tape or the video data read from the magnetic tape 10. The video A/D and D/A converter 28 converts an inputted analog video signal to a digital signal for storage on the magnetic tape, and converts a digital video signal read from the tape to an analog video signal.

The compressor/decompressor 23 compresses the signals from the video A/D and D/A converter 28 and the audio A/D and D/A converter 29 before recording the signals on the magnetic tape 10, and decompresses the video and audio data read from the magnetic tape 10. In addition, the compressor/decompressor 23 compresses or decompresses the MP3 data, which will be explained later.

The formatter/deformatter 31 converts a format of the MP3 data and the data recorded on the magnetic tape 10. The MP3 data and the audio data recorded on the audio sectors 15*b* of the magnetic tape 10 have different formats. Accordingly, the MP3 data cannot be directly recorded on the audio sectors 15*b*. The formatter of the formatter/deformatter 31 divides and groups the MP3 data to be stored in one audio sector 15*b*. Thus, the MP3 data is converted into a data format which can be recorded on the audio sector 15*b*. The deformatter of the formatter/deformatter 31 consecutively receives the audio data, and divides and groups the audio data for the operation of an MP3 player. Therefore, the MP3 data recorded on the audio sector 15*b* is converted from the data format which can be stored in the audio sector 15*b* to an MP3 data format.

The encoder/decoder 33 converts a general analog signal into MP3 data, or vice versa. That is, when a signal inputted to the digital magnetic recording/reproducing device is the general audio signal, the encoder of the encoder/decoder 33 converts the audio signal into the MP3 data. The decoder of the encoder/decoder 33 converts the MP3 data into the general audio signal.

When the head reads the MP3 data recorded on the audio sector 15*b* of the magnetic tape 10, the memory 35 receives the data from the deformatter of the formatter/deformatter 31, and temporarily stores the data. Accordingly, the memory 35 temporarily stores the output data from the deformatter of the formatter/deformatter 31, and the decoder of the encoder/decoder 33 decodes the MP3 data.

The microcomputer 21 includes a signal type discrimination unit 21*a* and a head control unit 21*b*, and controls the operation of the compressor/decompressor 23, the equalizer 25, the formatter/deformatter 31, the encoder/decoder 33, the video A/D and D/A converter 28, and the audio A/D and D/A converter 29. In addition, the microcomputer 21 detects a type of the recorded or reproduced signal by using the signal type discrimination unit 21*a*, and controls the head (not shown) to record different types of audio data on the respective audio sectors 15*a*, 15*b* by using the head control unit 21*b*.

In accordance with the present invention, the digital magnetic recording/reproducing device also includes a recording selection unit 38 and a reproduction selection unit 39. The recording selection unit 38 selectively transmits the input audio signal to the audio A/D and D/A converter 29, the formatter/deformatter 31 and the encoder/decoder 33. The reproduction selection unit 39 selectively transmits the audio data from the compressor/decompressor 23 to the audio A/D and D/A converter 29 and the formatter/deformatter 31. The operation of the recording selection unit 38 and the reproduction selection unit 39 is controlled by the microcomputer 21. According to the discrimination result of the signal type discrimination unit 21*a*, the microcomputer 21 controls the operation of the recording selection unit 38 and the reproduction selection unit 39.

Figure 3:
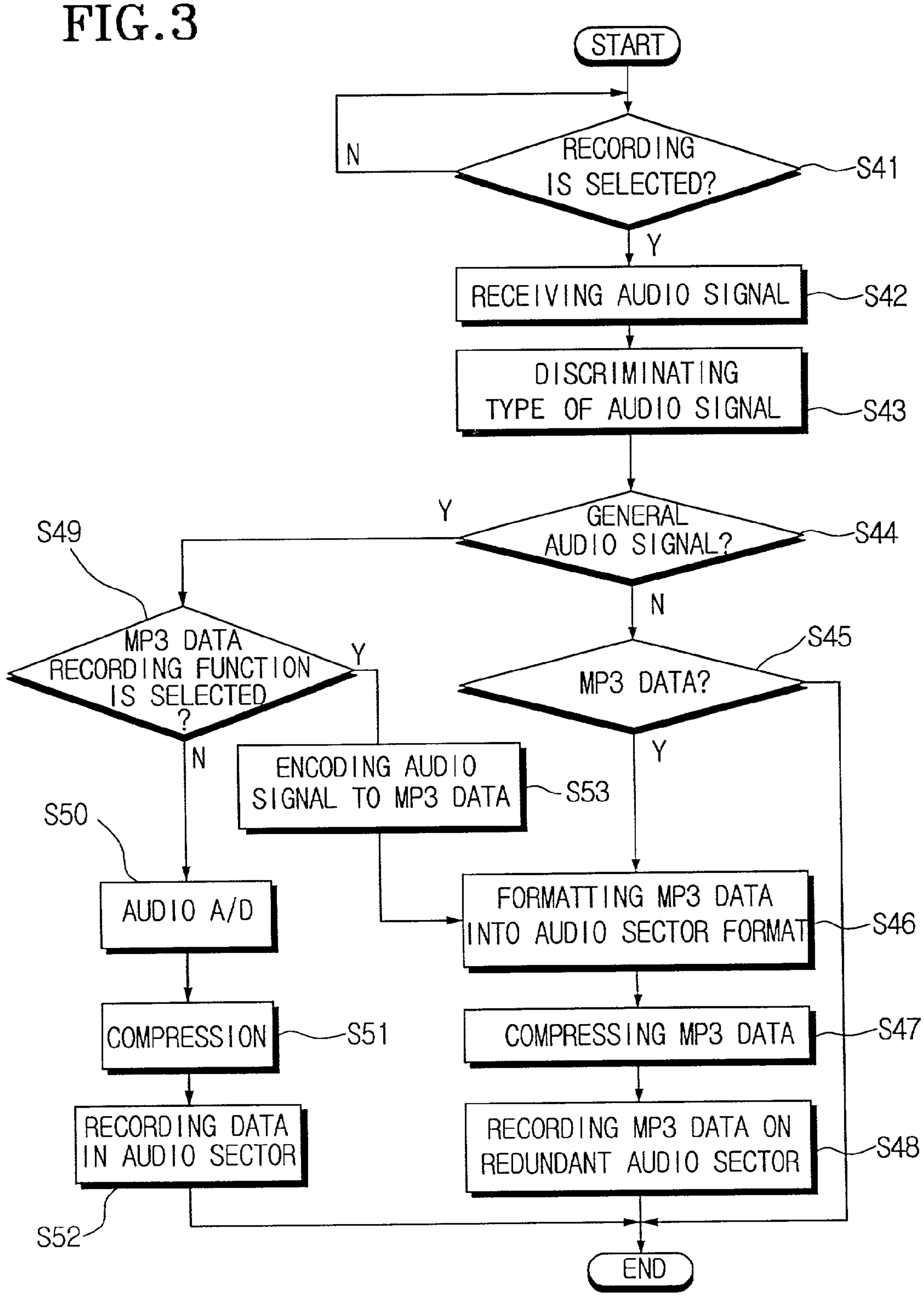
FIG. 3 is a flowchart showing sequential steps of a method for recording MP3 data by using the digital magnetic recording/reproducing device in FIG. 2, in accordance with the principles of the present invention.

FIG. 3 is a flowchart showing sequential steps of a method for recording MP3 data in accordance with the present invention. Specific operation buttons (not shown) are provided on an operation panel of the digital magnetic recording/reproducing device 20, so that the user can select recording or reproduction. When the user selects 'recording' through the operation button (step S41), the recording operation of the digital magnetic recording/reproducing device 20 is started.

When an audio signal is inputted to the digital magnetic recording/reproducing device 20 (step S42), the audio signal is transmitted to the microcomputer 21 through the recording selection unit 38. The signal type discrimination unit 21*a* of the microcomputer 21 detects a type of the input audio signal (step S43). In this embodiment, the signal type discrimination unit 21*a* discriminates whether the input audio signal is a general audio signal (step S44) or MP3 data (step S45). However, this operation is performed merely by discriminating whether the audio signal is the MP3 data or not. As an exemplary discrimination method, it is discriminated whether the audio signal has a specific code of the MP3 data. When the specific code of the MP3 data is not found in the input signal, the signal type discrimination unit 21a determines that the input audio signal is the general analog audio signal (step S44). When the specific code of the MP3 data is found in the input signal, the signal type discrimination unit 21a determines that the input audio signal is the MP3 data (step S45).

When the audio signal is the MP3 data, the microcomputer 21 controls the recording selection unit 38 so that the input audio signal can be transmitted to the formatter/deformatter 31. The formatter of the formatter/deformatter 31 divides and groups the MP3 data in a predetermined size (step S46), and formats the data to be stored in the audio sector 15b of the magnetic tape 10. The formatted MP3 data is compressed in the compressor of the compressor/decompressor 23 (step S47), and recorded on the audio sectors 15 by the head (not shown) (step S48). Here, the head control unit 21b of the microcomputer 21 controls the head so that the MP3 data can be inputted to the redundant audio sectors 15b which are not used to record the general audio data.

When the audio signal is the general audio signal, as the discrimination result of the signal type discrimination unit 21a, the microcomputer 21 controls the recording selection unit 38 according to a recording method inputted by the user (step S49). When the user selects a general audio signal input function, the microcomputer 21 controls the recording selection unit 38 so that the input signal can be inputted to the audio A/D and D/A converter 29. Accordingly, identically to the conventional digital magnetic recording/reproducing device, the audio signal is converted into the digital audio data by the audio A/D converter of the audio A/D and D/A converter 29 (step S50), compressed by the compressor/decompressor 23 (step S51), and recorded on the audio sectors 15a of the magnetic tape 10 (step S52). Here, the head control unit 21b of the microcomputer 21 controls the head so that the audio data can be recorded on the audio sectors 15a corresponding to the video sectors 13.

When the audio signal is the general audio signal, as the discrimination result of the signal type discrimination unit 21a, the audio signal can be converted into the MP3 data according to the user's selection (step S49). For example, a selection button for inputting the audio signal as the MP3 data is provided on the operation panel of the digital magnetic recording/reproducing device. The user can convert the general audio signal into the MP3 data by using the selection button. In this case, the microcomputer 21 controls the recording selection unit 38 so that the input audio signal can be transmitted to the encoder/decoder 33. The encoder of the encoder/decoder 33 encodes the audio signal into the MP3 data (step S53), and transmits the data to the formatter/deformatter 31. Thereafter, the identical procedure (steps S46 to S48) is performed to record the MP3 data on the redundant audio sectors 15b.

When the user selects a general video/audio recording operation, the audio signal and the video signal are recorded at the same time. That is, identically to the recording operation of the general digital magnetic recording/reproducing device, the image and audio signals inputted through a photographing device (not shown) and the microphone (not shown) are inputted respectively to the video A/D and D/A converter 28 and the audio A/D and D/A converter 29, and the converted digital video and audio data are compressed in the compressor/decompressor 23, and recorded on the magnetic tape 10.

As described above, when the general audio signal is inputted, the audio data is recorded on the audio sectors 15a corresponding to the video sectors 13, and when the MP3 data is inputted, the MP3 data is recorded on the redundant audio sectors 15b. Accordingly, the user can record the general audio signal on the front audio sectors 15a of one frame, and simultaneously record the MP3 data on the redundant audio sectors 15b. Here, the recorded MP3 data may be an audio data dubbed additionally to the sound of the audio sectors 15a recording the sound corresponding to the video sectors 13, or an individual audio data. In addition, even when the general audio data is inputted, the user can convert the audio signal into the MP3 data, and inputs the data to the redundant audio sectors 15b.

Figure 4:
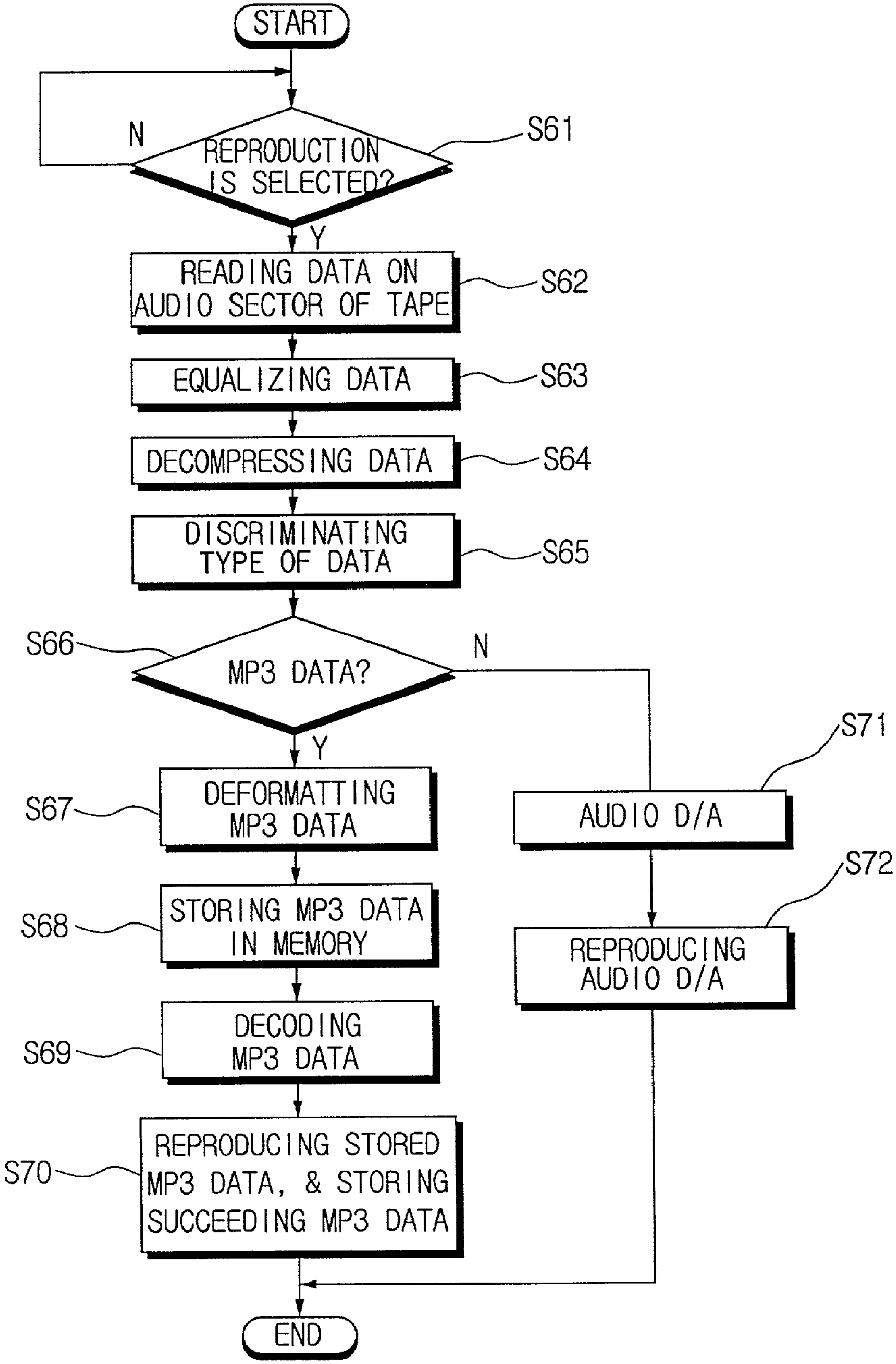
FIG. 4 is a flowchart showing sequential steps of a method for reproducing MP3 data by using the digital magnetic recording/reproducing device in FIG. 2, in accordance with the principles of the present invention.

FIG. 4 is a flowchart showing sequential steps of a method for reproducing MP3 data in accordance with the present invention. When the user selects 'reproduction' by using the operation button on the operation panel of the digital magnetic recording/reproducing device 20 (step S61), the reproduction operation is started.

The microcomputer 21 reads the signal recorded on the audio sectors 15 of the magnetic tape by using the head (step S62). The read signal is equalized by the equalizer 25 (step S63), and inputted to the compressor/decompressor 23. The compressor/decompressor 23 decompresses the compressed signal (step S64), and inputs the decompressed signal to the reproduction selection unit 39.

The signal type discrimination unit 21a of the microcomputer 21 discriminates a type of the reproduced audio data or identifies the type of reproduced data (step S65). When the audio data is the MP3 data (step S66), the microcomputer 21 controls the reproduction selection unit 39 so that the audio data can be inputted to the formatter/deformatter 31. When the audio data is the general audio data, the microcomputer 21 controls the reproduction selection unit 39 so that the audio data can be inputted to the audio A/D and D/A converter 29 (step S71) and then reproduced (step S72). As described above, whether the audio data is the MP3 data can be easily confirmed by determining whether a specific code of the MP3 data is included in the reproduced data.

The formatter/deformatter 31 consecutively receives, divides and groups the audio data, and deformats the audio data into the MP3 data for the operation of the MP3 player (step S67). The deformatted MP3 data is stored in the memory 35 (step S68). The decoder of the encoder/decoder 33 receives and decodes the MP3 data from the memory 35 (step S69), and outputs the audio signal. The outputted audio signal is provided to the speaker (not shown). The speaker reproduces the MP3 data (step S70).

The operation of reading data of a signal which is not yet reproduced and the operation of decoding the MP3 data (steps S62 to S69) are consecutively performed during the reproduction operation (step S70). Accordingly, the MP3 data of the succeeding reproduction section is restored and stored in the memory 35 during the reproduction operation.

For example, when the data stored in the audio sectors 15b is the music-related MP3 data, a running time of one song is about 3 to 5 minutes. When the song is stored in the audio sectors 15b, it takes about 30 seconds to 1 minute to restore the data of one song into MP3 data format and store the data in the memory 35. Therefore, when the user selects an MP3 reproduction operation, the MP3 data of the first song is stored in the memory for about 30 seconds to 1 minute, and then the first song is reproduced. While the first song is reproduced, the MP3 data of the succeeding song is stored in the memory 35. Accordingly, the user can listen to music without additional time delay, after storing the MP3 data of the first song in the memory 35. Here, when the restoration of the MP3 data of the first song is finished, the first song starts to be reproduced. However, when the reproduction of the first song and the restoration of the MP3 data of the first song are performed at the same time, the user can reproduce the first song without time delay.

When the user selects a general video/audio reproduction operation, identically to the reproduction operation of the general digital magnetic recording/reproducing device, the data of the video sectors 13 and the audio sectors 15*a* read through the head are inputted respectively to the video A/D and D/A converter 28 and the audio A/D and D/A converter 29 through the equalizer 25 and the compressor/decompressor 23. The video A/D and D/A converter 28 and the audio A/D and D/A converter 29 transmit the data respectively to a display (not shown) and the speaker (not shown). Thus, the digital image and sound are reproduced.

When the data stored in the audio sectors 15*b* is a dubbing data corresponding to the image and sound stored in the video sectors 13 and the audio sectors 15*a*, the dubbing MP3 data can be reproduced during the general video/audio reproduction operation according to the user's selection. In addition, when the data stored in the audio sectors 15*b* does not relate to the image and sound stored in the video sectors 13 and the audio sectors 15*a*, the MP3 data can be individually reproduced. According to the user's selection, the dubbing sound is reproduced with the image, or the music is individually reproduced.

In the reproduction method of the present invention, the signal type discrimination unit 21*a* of the microcomputer 21 discriminates a type of the reproduced audio data, and the microcomputer 21 controls the reproduction selection unit 39 according to the discrimination result. However, different reproduction methods may be employed. For example, the microcomputer 21 wholly or selectively reproduces the data on the front audio sectors 15*a* and the last audio sectors 15*b* through the head control unit 21*b*. That is, when one audio data or two types of audio data are reproduced according to the user's selection, the head control unit 21*b* performs the reproduction operation on the corresponding audio sectors 15*a* and/or 15*b*.

In this embodiment, the MP3 data is recorded on the redundant audio sectors 15*b*. However, the MP3 data may be recorded on the recording sectors including the audio sectors 15*a* and the video sectors 13.

In addition, the recording and reproduction operations of the MP3 data were exemplified above. However, the present invention can also be employed for data distinguished from the audio data corresponding to the video data, for examples, audio data such as AC-3 data. AC-3 has been described as a Dolby digital audio compression standard developed by the Digital Coder group at Dolby Labs.

In this embodiment, two types of audio signals are discriminated, recorded on the different audio sectors 15*a*, 15*b*, and reproduced. However, the present invention can be applied to three or more types of audio signals. In this case, the encoder/decoder 33 and the formatter/deformatter 31 may perform the encoding/decoding operation and the formatting/deformatting operation on the plural types of data, or a plurality of encoders/decoders and formatters/deformatters may be additionally provided according to the types of the data.

In accordance with the present invention, the different types of audio data can be recorded and reproduced on the magnetic tape for the digital magnetic recording/reproducing device. Especially, the different type of audio data can be recorded and reproduced by using the redundant audio sectors which are not used to store the general audio data. Accordingly, the different type of audio data can be dubbed or the music can be individually recorded, by using the magnetic tape where the image and sound have been recorded.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A digital magnetic recording apparatus, comprising:

an analog-to-digital converter for converting an input audio signal into digital data;

a formatter for formatting the input audio signal in an appropriate size to be stored in respective recording sectors of a magnetic tape selected from among a first plurality of sectors of the magnetic tape;

a recording selection unit having an input for receiving the input audio signal, and having outputs connected to respective inputs of said analog-to-digital converter and said formatter for selectively transmitting the input audio signal to one of said input of said formatter and said input of said analog-to-digital converter in dependence upon a type of the input audio signal; and a control unit for controlling a head to record second output data from said analog-to-digital converter on a second plurality of sectors of the magnetic tape and to record first output data from said formatter on the first plurality of sectors of the magnetic tape, said first and second pluralities of sectors being distinguishable.

2. The apparatus of claim 1, further comprising an encoder having an input connected to an additional output of said recording selection unit for converting the input audio signal into predetermined digital data, and for providing the digital data to said formatter.

3. The apparatus of claim 2, the predetermined digital data being MP3 data.

4. The apparatus of claim 2, the predetermined digital data being AC-3 data.

5. The apparatus of claim 2, further comprising a discrimination unit for detecting a type of the input audio signal, the detected type being one type selected from among a plurality of types of data, said recording selection unit being controlled in dependence upon a result of said detecting performed by said discrimination unit.

6. The apparatus of claim 5, said plurality of types of data including at least MP3 data, analog data, and digital data which is not MP3 data.

7. The apparatus of claim 6, the magnetic tape including at least said first plurality of sectors, said second plurality of sectors, and general video sectors, said general video sectors storing video data, said second plurality of sectors being general audio sectors storing audio data corresponding to the video data, said first plurality of sectors being redundant audio sectors.

8. The apparatus of claim 1, further comprising a discrimination unit for discriminating a type of the input audio signal, said recording selection unit being controlled in dependence upon a result of said discriminating performed by said discrimination unit.

9. The apparatus of claim 1, the magnetic tape including at least said first plurality of sectors, said second plurality of sectors, and general video sectors, said general video sectors storing video data, said second plurality of sectors being general audio sectors storing audio data corresponding to the video data, said first plurality of sectors being redundant audio sectors.

10. A digital magnetic reproducing apparatus, comprising:

a digital-to-analog converter for converting a first type of audio data read from a magnetic tape to an analog audio signal;

a deformatter for deformatting a second type of audio data read from the magnetic tape to produce a deformatted data output;

a decoder having an input connected to an output of said deformatter for decoding the deformatted data output from said deformatter; and a reproduction selection unit having an input for receiving general audio data, and having outputs connected to respective inputs of said digital-to-analog converter and said deformatter for selectively transmitting the general audio data read from the magnetic tape to one of said deformatter and said digital-to-analog converter in dependence upon a type of the general audio data, said general audio data including said first and second types of audio data.

11. The apparatus of claim 10, said deformatting of said second type of audio data comprising dividing and grouping said second type of audio data to produce data having a predetermined structure.

12. The apparatus of claim 11, further comprising a discrimination unit for detecting said type of the general audio data, said reproduction selection unit being controlled in dependence upon the detected type of the general audio data as detected by said discrimination unit.

13. The apparatus of claim 12, further comprising a memory for temporarily storing an output of said deformatter, and for providing the stored output to said decoder.

14. The apparatus of claim 13, the data having the predetermined structure comprising one of MP3 data and AC-3 data.

15. The apparatus of claim 13, said decoder inputting the data having the predetermined structure and outputting analog data.

16. The apparatus of claim 11, the data having the predetermined structure comprising one of MP3 data and AC-3 data.

17. The apparatus of claim 10, further comprising a discrimination unit for detecting said type of the general audio data, said reproduction selection unit being controlled in dependence upon the detected type of the general audio data as detected by said discrimination unit.

18. The apparatus of claim 10, further comprising a memory for temporarily storing an output of said deformatter, and for providing the stored output to said decoder.

19. The apparatus of claim 10, said second type of audio data being provided to said deformatter and comprising MP3 data.

20. A method for recording different types of audio data on a magnetic tape for a digital magnetic recording/reproducing device, comprising the steps of:

detecting a type of an input audio signal;

when a format of the input audio signal does not correspond to a recording format of recording sectors of the magnetic tape, formatting the input audio signal in an appropriate size to be stored in the recording sectors of the magnetic tape; and recording a plurality of different types of audio signals in respective recording sectors of the magnetic tape.

21. The method of claim 20, the magnetic tape including general audio sectors for storing general audio data, and general video sectors for storing video data corresponding to said general audio data, said recording sectors recording said formatted data, said recording sectors being redundant audio sectors, said redundant audio sectors being distinguishable from said general audio and video sectors.

22. The method of claim 20, further comprising the step of encoding the input audio signal into predetermined digital data, said encoding being performed after said detecting and before said formatting.

23. The method of claim 22, said predetermined digital data being MP3 data.

24. The method of claim 22, said encoding being performed according to a selection.

25. The method of claim 24, said selection comprising a selection performed by a user.

26. The method of claim 25, the magnetic tape including general audio sectors for storing general audio data, and general video sectors storing video data corresponding to said general audio data, said recording sectors recording said formatted data, said recording sectors being redundant audio sectors, said redundant audio sectors being distinguishable from said general audio and video sectors.

27. A method reproducing plural types of audio data stored on respective recording sectors of a magnetic tape for a digital magnetic recording/reproducing device, comprising the steps of:

detecting at least one type of audio data read from said respective recording sectors of the tape, said at least one type including at least a first type of audio data and a second type of audio data;

performing one of digital-to-analog conversion and deformatting, said digital-to-analog conversion being selected and converting digital audio data read from the tape to analog audio data when said detecting detects the first type of audio data, said deformatting being selected and deformatting the audio data read from the tape when said detecting detects the second type of audio data, said first and second types of audio data being distinguishable;

decoding said deformatted audio data to produce decoded audio data; and reproducing one of the analog audio data and the decoded audio data.

28. The method of claim 27, said deformatting and decoding being performed before said reproducing.

29. The method of claim 28, said second type of data corresponding to a predetermined structure of digital data, said first type of data corresponding to digital data other than said predetermined structure of digital data.

30. The method of claim 29, said predetermined structure of digital data corresponding to MP3 data.

31. The method of claim 30, said decoding comprising generating analog data from the MP3 data.

32. The method of claim 29, said decoding comprising generating analog data from the digital data having the predetermined structure.

33. The method of claim 27, said deformatting comprising generating MP3 data from the digital audio data read from the tape.

* * * * *